Patented Dec. 28, 1948

2,457,688

UNITED STATES PATENT OFFICE 2,457,688

METHYL SILOXANE GUMS AND ELASTOMERS

Robert H. Krieble and John R. Elliott, Schenectady, N. Y., assignors to General Electric Company, a corporation of New York No Drawing. Application June 11, 1945, Serial No. 598,914

6 Claims. (Cl. 260—37)

The present invention relates to methyl silicone gums and elastomers. It is particularly concerned with methyl silicone gums containing monomethyl-, dimethyl-, and trimethyl-substituted silicon atoms and with elastomers obtained from such gums.

Dimethyl silicone elastomers and methods of preparing such elastomers are described in the copending application of Maynard C. Agens, Serial No. 526,473, now Patent No. 2,448,756, and the copending application of James G. E. Wright and Curtis S. Oliver, Serial No. 526,472, now Patent No. 2,448,565, both of which applications were filed March 14, 1944, and assigned to the same assignee as the present invention. Briefly described, the silicone elastomers comprise mixtures of (1) dimethyl silicone gums obtained by treating liquid dimethyl silicones, for example, with ferric chloride or mixtures of ferric oxide and aluminum chloride, and (2) suitable fillers. The gums can also be prepared by treating the liquid silicones with sulphuric acid as described in the copending application Serial No. 598,913, filed concurrently herewith in the names of James Marsden and George F. Roedel and assigned to the same assignee as the present invention. The methyl-to-silicon ratio of the gums ranges from 1.98 to 2.00. They are prepared from liquid mixtures of polymeric silicones having the same methyl-to-silicon ratio, which liquid silicones are in turn prepared by hydrolysis of a pure or a substantially pure dimethyl silane having the formula $(CH_3)_2SiX_2$, where X represents a hydrolyzable group such as a halogen or alkoxy radical, containing not more than 2 mol per cent of a hydrolyzable monomethyl silane of the formula $CH_3SiX_3$. To obtain elastomers which can be rapidly cured, for example, in a closed mold, small amounts of benzoyl peroxide or other suitable curing agent are added to the gum filler mixture at the time the gum and filler are worked on the rubber rolls. In the cured vulcanized state the resultant elastomers possess some of the properties of vulcanized natural rubber and are particularly characterized by their flexibility at low temperatures and their resistance to heat.

The gums and elastomers of the present invention are broadly distinguished from those described in the above-mentioned applications by the fact that they contain trimethyl-substituted silicon atoms in addition to monomethyl- and dimethyl-substituted silicon atoms. They are further distinguished by the fact that they may also contain a larger proportion of monomethyl-substituted silicon atoms than previously known products of this type. Preferably, the gums of the present invention are prepared from the oily products of hydrolysis of a mixture of trimethylchlorosilane, dimethyldichlorosilane and monomethyltrichlorosilane, or a mixture of other suitable tri-, di- and mono-methyl silanes in which the remaining silicon valences are connected to hydrolyzable groups or radicals other than chlorine, in such proportions that the average methyl-to-silicon ratio of the mixture is equal to at least 1.98, preferably at least 1.995, and is less than 2.00. The mixture of silanes from which the oily hydrolysis products are made should contain not over 5 mol per cent, preferably from about 0.4 to 5 mol per cent, of the monomethyl silane and from 0.4 to 0.95 mol of the trimethyl silane per mol of the monomethyl silane, the remainder being a dimethyl silane. Stated alternatively, the curable gums of the present invention may be considered as being solid, elastic, curable methylpolysiloxanes obtained by condensing a liquid consisting of polymeric dimethylsiloxane containing (a) from 0.4 to 5 mol per cent copolymerized monomethylsiloxane and (b) copolymerized trimethylsiloxane wherein the number of trimethyl-substituted silicon atoms is present in an amount equal to from 40 to 95 per cent of the number of monomethyl-substituted silicon atoms. Since little if any change in the methyl-to-silicon ratio takes place during hydrolysis of the silanes and the conversion of the hydrolysis products to a gum, the percentage proportions of mono-, di-, and tri-methyl substituted silicon atoms in the silicone gum will be the same as the mol per cent of mono-, di-, and tri-methyl silanes in the original silane mixture.

Except for the introduction of the designated proportions of a trimethyl silane into the hydrolyzable silane mixture from which the gums are prepared, the processes, catalysts, fillers, etc. employed in the preparation of the elastomers of the present invention are the same as are employed in the preparation of the gums and elastomers described and claimed in the above-mentioned copending applications. For example, the methyl silicone oils or liquids are converted to gums by treatment either with ferric chloride, mixtures of ferric oxide and aluminum chloride, or sulphuric acid and the resultant gums, preferably after first being washed to remove most or all of the catalyst, are compounded with suitable fillers, curing catalysts and the like and thereafter cured to bring out the elastomeric properties.

Both the gums and elastomers of the present invention are softer than previously known gums and elastomers having the same methyl-to-silicon ratios. They are also characterized by a low permanent set at high temperatures. As the result of this combination of properties, the elastomers are particularly suitable for use as gasket materials.

In order that those skilled in the art better may understand how the present invention is carried into effect, the following illustrative examples are given:

*Example 1*

An oil was prepared by cohydrolyzing in water a mixture of methyl chlorosilanes containing about 98.081 mol per cent dimethyldichlorosilane, 0.984 mol per cent methyltrichlorosilane, and 0.934 mol per cent trimethylchlorosilane (methyl-to-silicon ratio 1.9996). The oil was polymerized to yield a very soft, elastic gum by heating for several hours at 125° C with 0.3 weight per cent of ferric chloride hexahydrate.

125 grams of the gum was compounded on mill rolls with 1.25 g. lead oxide (PbO) and 188 g. titanium dioxide. After thorough milling 2.5 g. of benzoyl peroxide dissolved in 10 ml. of toluene was added and mixing accomplished by milling for 5 minutes. Plugs 1 inch in diameter and ½ inch thick were prepared by molding the compound 10 minutes at 150° C. The plugs had a Shore hardness of less than 2. After curing these plugs 72 hours at 200° C. the Shore hardness was 6–8. After curing the plugs for 12–72 hours at 200° C. the permanent set after 30 per cent compression for 6 hours at 150° C. varied from 38 to 50 per cent. The compression set characteristics were determined by the method described in the copending application of James Marsden and George F. Roedel mentioned hereinbefore.

200 g. of the above compound was milled with an additional 7.2 g. of lead oxide and 40 g. titanium dioxide for 20 minutes. Sheets were made from this compound by pressing for 10 minutes at 150°. Dumbbells were cut from the sheet and cured for 12–72 hours at 200° C. The tensile strength of the dumbbells was 280–330 p. s. i.

*Example 2*

An oil was prepared by cohydrolyzing a mixture of 91.346 mol per cent dimethyldichlorosilane, 4.807 mol per cent methyltrichlorosilane and 3.846 mol per cent trimethylchlorosilane (average methyl-to-silicon ratio 1.9903). The oil was polymerized by heating for two hours at 124° C. with 0.3 weight per cent of ferric chloride hexahydrate. The gum was soft and elastic. 125 g. of the gum was compounded on milling rolls with 1.25 g. lead oxide and 188 g. titanium dioxide, and then mixed on the rolls with 2.5 g. of benzoyl peroxide dissolved in 10 cc. of toluene. A very soft material resulted. Plugs 1 inch in diameter by ½ inch thick were prepared by molding the compound for 10 minutes at 150° C. and further cured by heating in an oven at 200° C. for 12 to 72 hours. The Shore harness of the cured plugs was 29–36, and the permanent set after 30 per cent compression for 6 hours at 150° C. varied between 43 and 34 per cent.

*Example 3*

An oil was prepared by cohydrolyzing a mixture of 98.503 mol per cent dimethyldichlorosilane, 0.995 mol per cent methyltrichlorosilane and 0.501 mol per cent trimethylchlorosilane (methyl-to-silicon ratio 1.9960). The resulting oil was polymerized and the gum compounded with fillers and benzoyl peroxide as described in Example 1. Plugs were prepared from the compound by molding for 10 minutes at 150° C. The plugs were further cured by heating in an oven at 200° C. for 12 to 72 hours. The shore hardness varied from 12 to 26, and the permanent set after 30 per cent compression for 6 hours at 150° C. varied between 34 and 16 per cent.

*Example 4*

The methyl silicone oil of Example 3 was polymerized to a gum by heating with 0.5 weight per cent ferric chloride hexahydrate. The gum was compounded with titanium dioxide, lead oxide and benzoyl peroxide as previously described. Plugs one inch in diameter and ½ inch thick were prepared from the compound by molding ten minutes at 150° C. The plugs were cured in an oven for 16 hours at 100° C. followed by 12–72 hours at 200° C. The Shore hardness varied from 24 to 35 and the permanent set from 56–23 per cent. Dumbbells cut from a sheet pressed from the above compound and cured as described for the plugs had tensile strengths varying from 320 to 370 pounds per square inch.

*Example 5*

An oil having a methyl-to-silicon ratio of 1.9973 was prepared by blending the cohydrolysis products of a mixture of methyltrichlorosilane and dimethyldichlorosilane and a mixture of dimethyldichlorosilane and trimethylchlorosilane. The blended oil, containing 99.37 mol per cent dimethyl silicon units, 0.45 mol per cent monomethyl silicon units and 0.18 mol per cent trimethyl silicon units, was polymerized to a soft gum by heating 5 hours at 123° C. with 0.5 weight per cent ferric chloride hexahydrate. The gum was compounded with fillers and benzoyl peroxide as previously described. A plug prepared from the compound after 16 hours cure at 100° C. and 72 hours at 200° C. had a Shore hardness of 8 and a permanent set of 42 per cent.

It is sometimes desirable to carry out the vulcanizing operation in two stages as described in the following examples. This is particularly true when the original compound is too soft to be easily handled in conventional rubber working equipment. The final hardness of the product is then much higher than when an equivalent amount of vulcanizing agent is added in a one step process.

*Example 6*

The gum described in Example 2 was compounded with titanium dioxide, lead oxide and 3 per cent benzoyl peroxide based on the weight of gum. The resultant compound was heated for two hours at 100° C. By this operation the compound was somewhat stiffened and was more amenable to further operations of compounding, sheeting and/or extruding than the original compound. It was then compounded with an additional 3 per cent of benzoyl peroxide. Plugs prepared from this compound by pressing for ten minutes at 150° C. had a Shore hardness of 37. When all the benzoyl peroxide was added in one step, plugs prepared by pressing the compound had a hardness of only 18.

While the invention has been particularly described with reference to specific catalysts, fillers, etc., it is to be understood that it is not limited thereto. Gums and elastomers which are within the scope of the present invention and which were obtained by means of sulphuric acid as a gum-forming agent are specifically described in the aforementioned copending application of James Marsden and George F. Roedel.

What we claim as new and desire to secure by Letters Patent of the United States is:

1. A methylpolysiloxane elastomer comprising (1) a filler and (2) a solid, elastic, curable methylpolysiloxane consisting of methyl radicals and silicon and oxygen atoms containing an average of from 1.98 to 2.0 methyl groups per silicon atom, said elastic methylpolysiloxane having been obtained by condensing a liquid consisting of polymeric dimethylsiloxane containing (a) from 0.4 to 5 mol per cent copolymerized monomethylsiloxane and (b) copolymerized trimethylsiloxane wherein the number of trimethyl-substituted silicon atoms are present in an amount equal to from 40 to 95 per cent of the number of monomethyl-substituted silicon atoms.

2. A solid, elastic, curable methylpolysiloxane consisting of methyl radicals and silicon and oxygen atoms containing an average of from 1.98 to 2.0 methyl groups per silicon atom, said elastic methylpolysiloxane having been obtained by condensing a liquid consisting of polymeric dimethylsiloxane containing (a) from 0.4 to 5 mol per cent copolymerized monomethylsiloxane and (b) copolymerized trimethylsiloxane wherein the number of trimethyl-substituted silicon atoms are present in an amount equal to from 40 to 95 per cent of the number of monomethyl-substituted silicon atoms.

3. A solid, elastic, curable methylpolysiloxane as in claim 2 wherein the methyl-to-silicon ratio is from 1.995 to 2.0.

4. A soft, solid, elastic methylpolysiloxane having a low permanent set at elevated temperatures comprising the heat-treated mixture of (1) a filler, (2) a solid, elastic, curable methylpolysiloxane consisting of methyl radicals and silicon and oxygen atoms containing an average of from 1.98 to 2.0 methyl groups per silicon atom, said elastic methylpolysiloxane having been obtained by condensing a liquid consisting of polymeric dimethylsiloxane containing (a) from 0.4 to 5 mol per cent copolymerized monomethylsiloxane and (b) copolymerized trimethylsiloxane wherein the number of trimethyl-substituted silicon atoms is present in an amount equal to from 40 to 95 per cent of the number of monomethyl-substituted silicon atoms, and (3) benzoyl peroxide in an amount sufficient to cure the said elastic, curable methylpolysiloxane.

5. The cured, elastic product as in claim 4 wherein the methyl-to-silicon ratio of the said elastic curable methylpolysiloxane is from 1.995 to 2.0.

6. The method of making a solid, elastic, curable methylpolysiloxane which comprises (1) forming a mixture consisting of silanes of the formulas $CH_3SiX_3$, $(CH_3)_2SiX_2$, $(CH_3)_3SiX$ wherein X represents a hydrolyzable group selected from the class consisting of halogens and alkoxy radicals attached to the silicon atoms in such proportions that the average methyl-to-silicon ratio of said mixture of silanes is from 1.98 to 2.00, the monomethylsilane comprising from 0.4 to 5 mol per cent of the said mixture of silanes, and the trimethylsilane being present in a molar amount corresponding to from 40 to 95 per cent of the molar amount of monomethylsilanes, (2) hydrolyzing said mixture of silanes, and (3) heating the isolated, hydrolyzed product with ferric chloride thereby to convert the hydrolyzed product to a solid, elastic material.

ROBERT H. KRIEBLE.
JOHN R. ELLIOTT.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,392,713 | Wright et al. | Jan. 8, 1946 |
| 2,410,737 | Jenny | Nov. 5, 1946 |

FOREIGN PATENTS

| Number | Country | Date |
|---|---|---|
| 113,708 | Australia | Sept. 4, 1941 |

OTHER REFERENCES

Rochow et al., Journ. Amer. Chem. Soc., vol. 63, March 1941, pp. 798 to 800. Copy in Sci. Lib.

Hyde et al.: Journ. Amer. Chem. Soc., vol. 63, May 1941, pp. 1194 to 1196.